US012385303B2

(12) United States Patent
Kolar et al.

(10) Patent No.: US 12,385,303 B2
(45) Date of Patent: Aug. 12, 2025

(54) DOOR HINGE FOR HOUSEHOLD APPLIANCES

(71) Applicant: TURNA D.O.O., Sostanj (SI)

(72) Inventors: Peter Kolar, Polzela (SI); Ales Plesnik, Sostanj (SI)

(73) Assignee: TURNA D.O.O, Sostanj (SI)

( * ) Notice: Subject to any disclaimer, the term of this patent is extended or adjusted under 35 U.S.C. 154(b) by 73 days.

(21) Appl. No.: 18/031,604

(22) PCT Filed: Aug. 10, 2021

(86) PCT No.: PCT/SI2021/050015
§ 371 (c)(1),
(2) Date: Apr. 12, 2023

(87) PCT Pub. No.: WO2022/081097
PCT Pub. Date: Apr. 21, 2022

(65) Prior Publication Data

US 2023/0392421 A1 Dec. 7, 2023

(30) Foreign Application Priority Data

Oct. 12, 2020 (SI) ................................ P-202000183

(51) Int. Cl.
*E05D 7/12* (2006.01)
*E05D 3/02* (2006.01)
(Continued)

(52) U.S. Cl.
CPC ............ *E05D 7/1066* (2013.01); *E05D 3/02* (2013.01); *F24C 15/023* (2013.01);
(Continued)

(58) Field of Classification Search
CPC ....... E05D 7/1066; E05D 3/02; F24C 15/023; E05Y 2900/308; E05Y 2201/624; E05Y 2201/214
See application file for complete search history.

(56) References Cited

U.S. PATENT DOCUMENTS 4,287,873 A * 9/1981 Goins .................. F24C 15/023
49/386
8,572,811 B2 * 11/2013 Lautenschlager ......... E05D 3/14
16/370
(Continued)

FOREIGN PATENT DOCUMENTS

DE 3145317 A1 * 5/1983
EP 1612487 A2 * 1/2006 ......... A47L 15/4261
(Continued)

*Primary Examiner* — Chuck Y Mah
(74) *Attorney, Agent, or Firm* — The Watson IP Group; Jovan N. Jovanovic

(57) ABSTRACT

The subject of the invention is an improved door hinge in household appliances. The hinge consists of a receiving part (1) fixed to an appliance housing, a hinge body (3) fixed to a household appliance door, a connecting arm (5) and a locking element (6) that is pivotally attached to the connecting arm (5) via a connecting axle (7). The locking element (6) consists of two substantially straight and parallel legs (6*a*, 6*b*) that are pivotally attached to the connecting arm (5) via the connecting axle (7). The legs (6*a*, 6*b*) are connected to each other in their upper part with a cross-piece (6*c*). Each of the legs (6*a*, 6*b*) is provided with a head (6*d*) of the convex C-shape with a certain curvature with a second contact surface (6*e*). The receiving part (1) is provided with matching elements (8) of a C-shaped concave shape with a certain curvature with the first contact surfaces (8*a*). The shape of the contact surfaces (6*e*) and (8*a*) allows the locking element (6) to always move to its stable position when placed in the locked position, even if the locking
(Continued)

Figure 1:
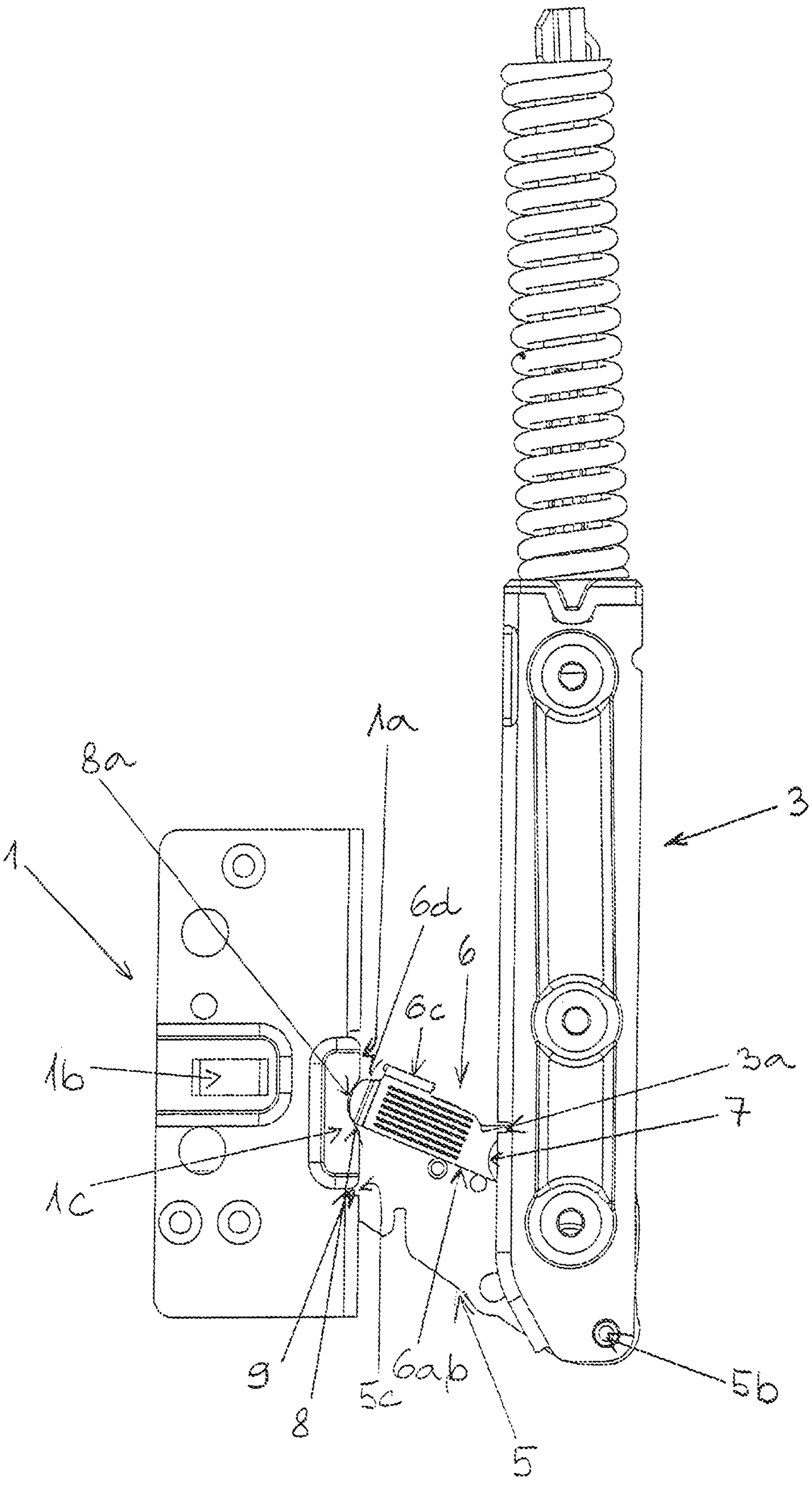

element (6) is in an unstable position, either in its upper or lower position.

9 Claims, 7 Drawing Sheets

(51) Int. Cl.
*E05D 7/10* (2006.01)
*F24C 15/02* (2006.01)
(52) U.S. Cl.
CPC ... *E05Y 2201/214* (2013.01); *E05Y 2201/624* (2013.01); *E05Y 2900/308* (2013.01)

(56) References Cited

U.S. PATENT DOCUMENTS

| | | | | |
|---|---|---|---|---|
| 9,739,081 | B2 * | 8/2017 | Stuke | E05F 5/10 |
| 10,526,827 | B2 * | 1/2020 | Salice | E05D 3/06 |
| 11,162,288 | B2 * | 11/2021 | Lee | E05D 11/1064 |
| 2003/0172920 | A1 * | 9/2003 | Gronbach | E05F 1/1261 126/197 |
| 2016/0201371 | A1 * | 7/2016 | Harding | E05D 5/06 244/129.4 |
| 2023/0392421 | A1 * | 12/2023 | Kolar | F24C 15/023 |

FOREIGN PATENT DOCUMENTS

| | | | | |
|---|---|---|---|---|
| EP | 1612487 B1 | | 2/2010 | |
| GB | 2245310 A | * | 1/1992 | E05D 11/1014 |

* cited by examiner

DOOR HINGE FOR HOUSEHOLD APPLIANCES

The subject of the invention is an improved door hinge in household appliances, such as a stove, oven, microwave oven. Preferably, the invention relates to a door hinge in ovens.

Hinges in household appliances usually consist of a receiving part fixed to the housing of the appliance, of a hinge body fixed to the door of the household appliance and of a connecting arm connecting the two parts to each other. On the side cooperating with the receiving part, the connecting arm is provided with a suitable connecting element (usually in the form of a notch), which allows for detachable attachment of the connecting arm to the receiving part, thus enabling easy mounting and dismounting of the door to/from the housing. On the side cooperating with the hinge body, the connecting arm is pivotally connected to the hinge body, which allows the hinge body to pivot around the axle and thus open and close the door.

The doors of household appliances, especially ovens, have a large mass due to their dimensions, this is why the hinge construction should desirably prevent the door from falling out of the housing, i.e. the connecting arm from falling out of the receiving part, even when the door is rapidly and jerkily opened and closed when huge forces act on the hinge in different directions. The connecting arm, even under the load of huge forces in different directions, should always tend to maintain an equilibrium position with respect to the receiving part, the equilibrium position being the one in which the minimum forces act on the hinge. In addition, it is desirable that the angle between the hinge body or the door and the connecting arm can be fixed by appropriate movements of the hinge components, preferably without tools, which makes it easier to remove the door from the housing or the connecting arm from the receiving part. The construction of the hinge further allows the connecting arm together with the hinge body and the door to be removed from the receiving part by appropriate movements of the hinge components, preferably without tools, or can be inserted back and fixed for use.

For this purpose, locking elements are used in hinges.

The function of the locking element in the locked position is mainly to hold the connecting arm in a fixed position in relation to the housing or the receiving part during operation, i.e. during door opening and closing. On the other hand, by moving the locking element from the locked to the unlocked position, preferably without tools, the connecting arm can be detached from the receiving part, i.e. the door can be removed from the housing. A further function of the locking element in the unlocked position is that it acts as a spacer that maintains a certain angle between the hinge body or the door and the connecting arm, which makes it easier to remove the door from the housing or the connecting arm from the receiving part.

The locking element can be formed in various ways; it is usually formed in a way that the locking element is pivotal about a fixed horizontal axis. This means that the locking element and the connecting arm are connected at one point via an axle about which the locking element is allowed to move from the unlocked position to the locked position. In the locked position, the locking element cooperates with the receiving element, while in the unlocked position, the locking element can cooperate with the hinge body to maintain a certain angle between the hinge body and the connecting arm. By pivoting about the fixed axis, the locking element rotates from the unlocked position to the locked position and vice versa.

Prior art discloses door hinges for household appliances with various configurations of locking elements. SI 24023 describes an embodiment of a hinge with a locking element configured as a butt latch.

EP 2952664 describes a locking element which is essentially formed of two parts. The locking element is not mounted on the connecting element pointwise, but a guide is made in the connecting element, which is an elongate opening with straight longitudinal sides along which the axle of the locking element moves when the locking element pivots from the locked position to the unlocked position. Activation of the locking element is not formed directly on the hinge frame, but is formed on the hinge connecting link.

In prior art hinges, the locking element, in extreme cases, may also fall out of its stable position, resulting in the locking element no longer performing its function, whereby the connecting arm may fall out of the receiving element and the door gets uncontrollably detached from the housing. In the event that the locking element falls out of its stable position and remains in some intermediate position, it can collide with the hinge mechanism and damage it.

The hinge according to the invention allows the connecting arm/receiving part assembly to be firm when the locking element is locked and prevents the connecting arm from getting detached from the receiving part under the load of jerky forces in different directions, for example during jerky door closing or opening. This is achieved by the construction of the hinge according to the invention, which allows the locking element to always tend to the most stable position within the locked position under the load of jerky forces in different directions and by indentations and corresponding recesses creating a tight fit between the locking element and the connecting arm. The tight fit between the locking element and the connecting arm is configured in a way to generate a loud click that indicates the final position of the locking element.

Figure 2:
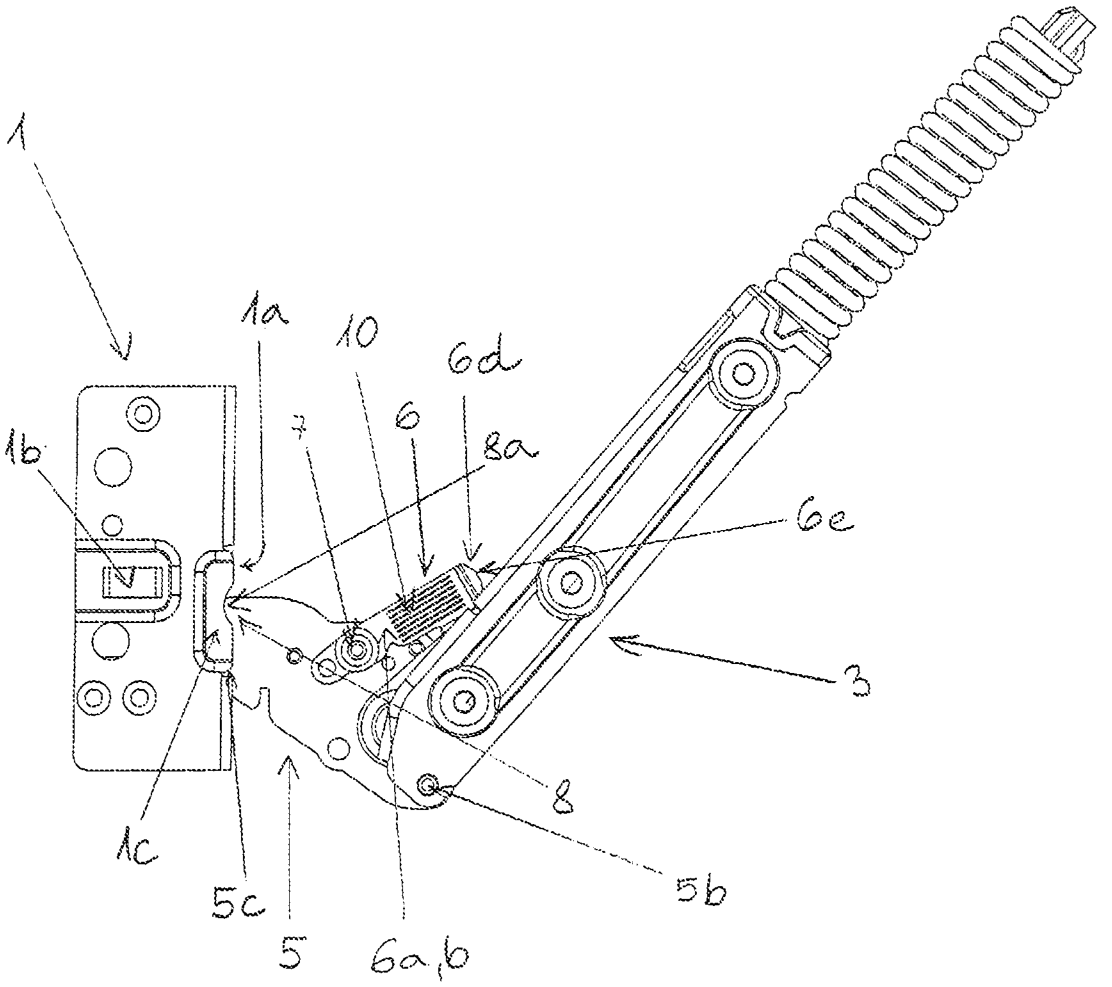
Figure 3:
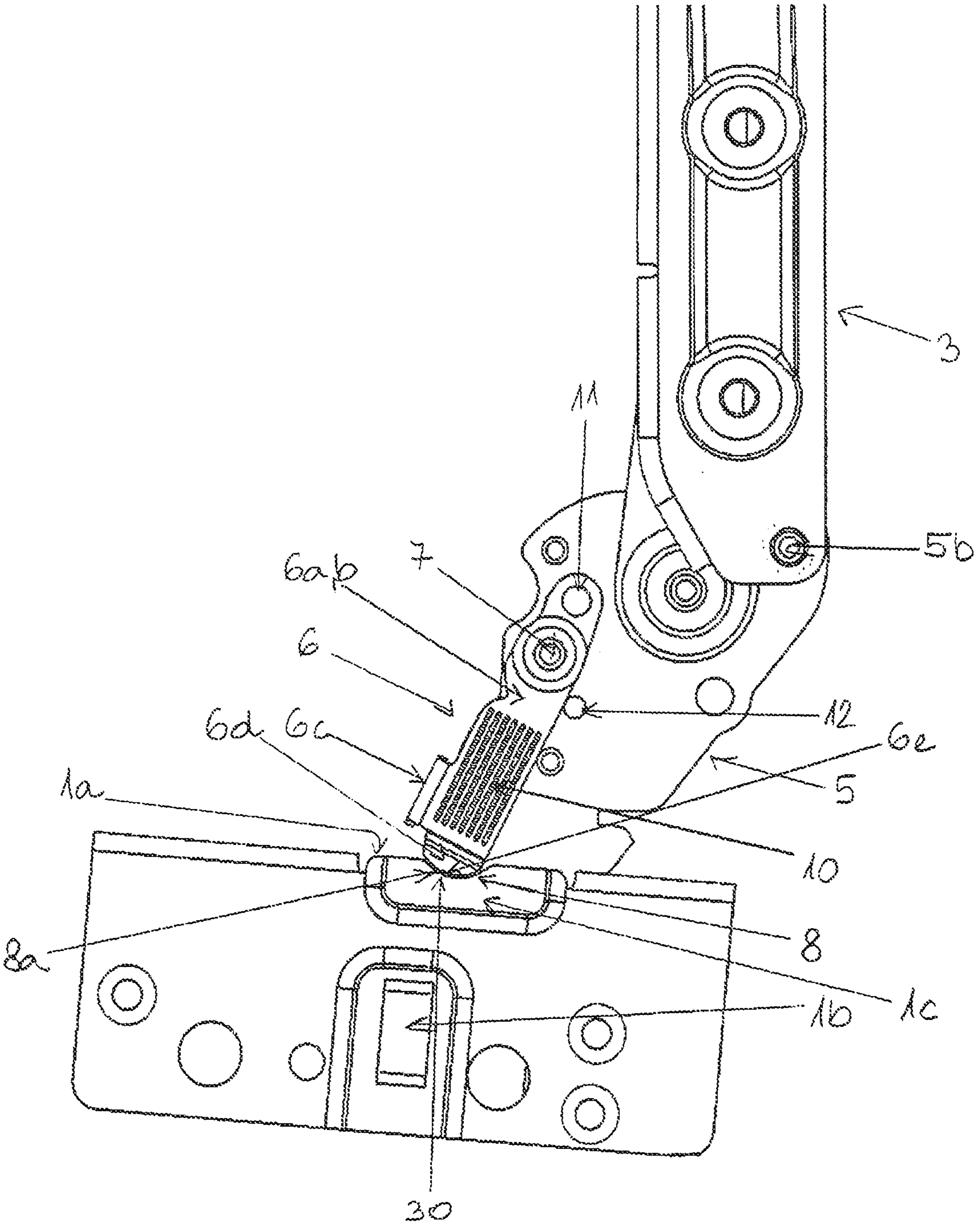
Figure 4:
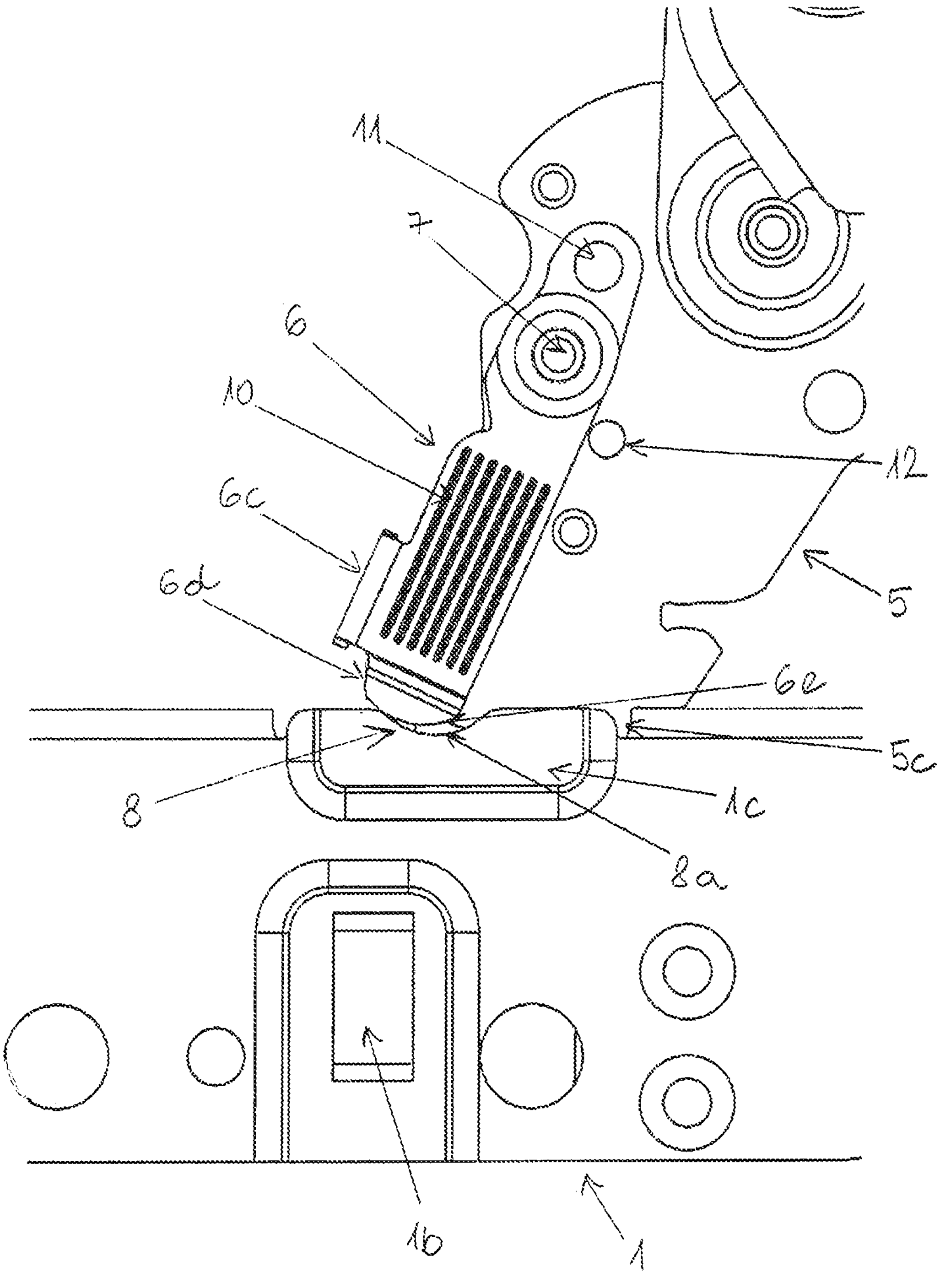
Figure 5:
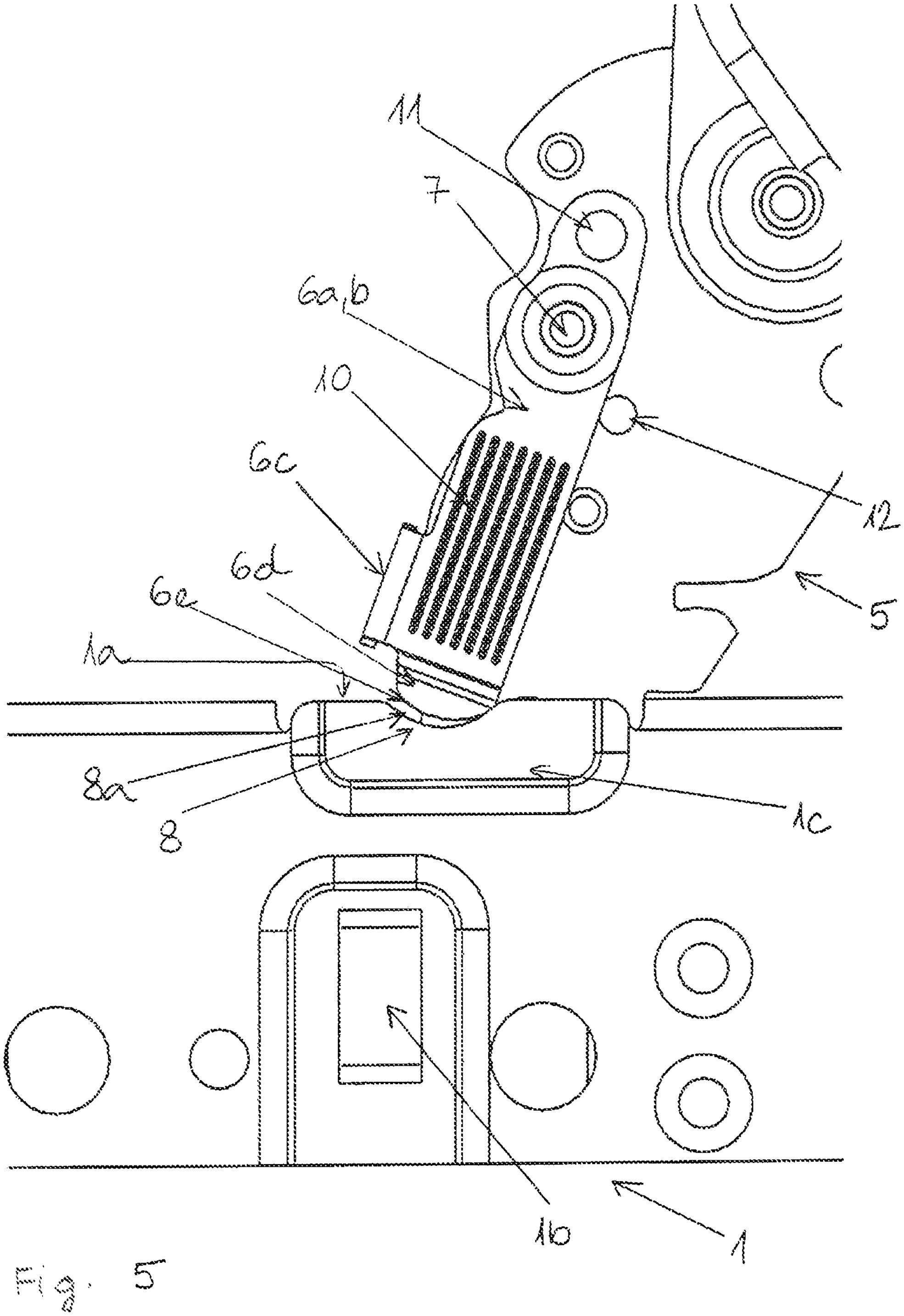
Figure 6:
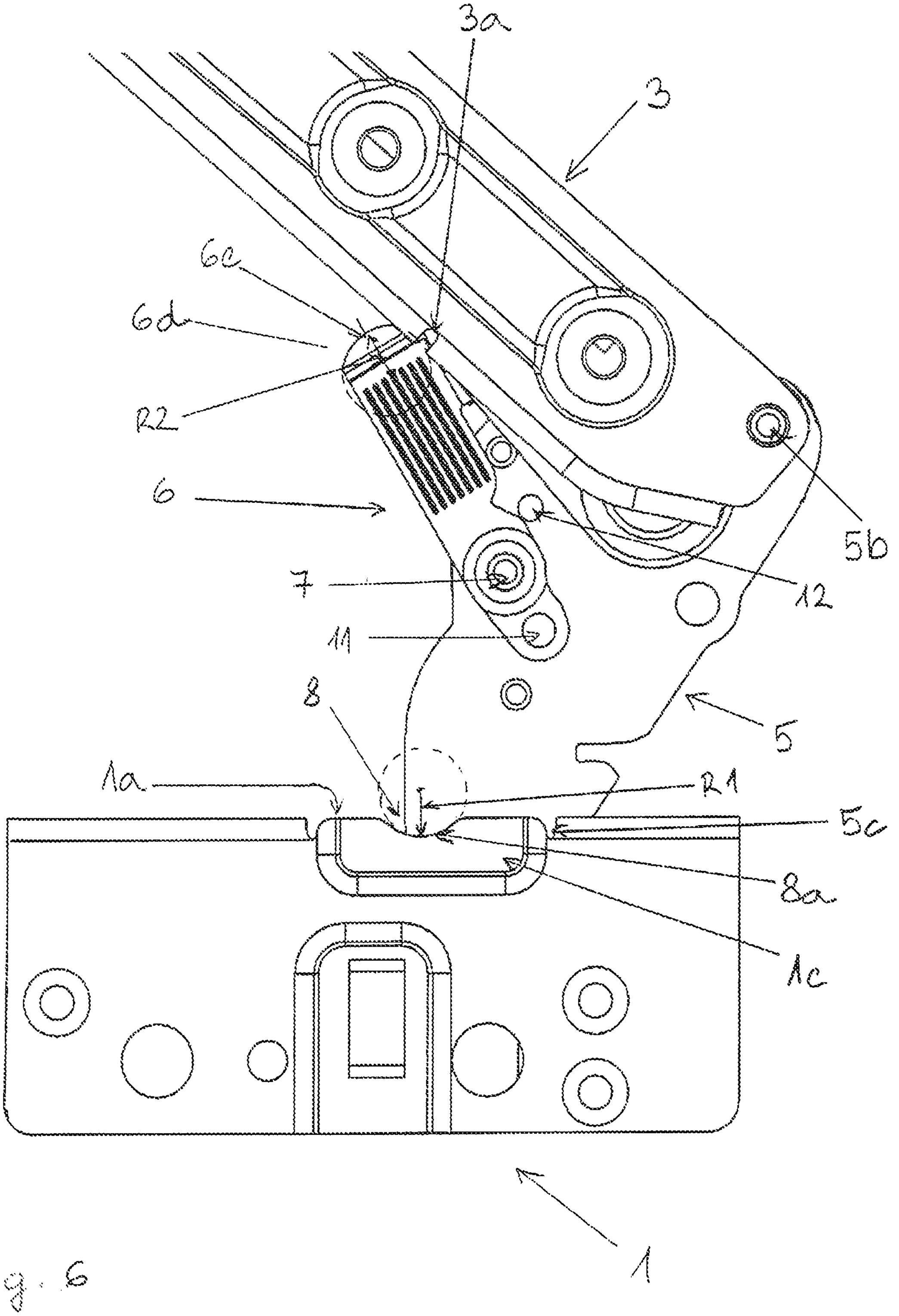

The hinge of the invention will be described in more detail hereinbelow and illustrated on the figures which show:

FIG. 1 is a schematic representation of the hinge of the invention in the locked position FIG. 2 is a schematic representation of the hinge of the invention in the unlocked position FIG. 3 is a schematic representation of a hinge detail of FIG. 1, wherein the locking element is in the stable position within the locked position FIG. 4 is a schematic representation of a hinge detail of FIG. 1, wherein the locking element is in the upper unstable position within the locked position FIG. 5 is a schematic representation of a hinge detail of FIG. 1, wherein the locking element is in the lower unstable position within the locked position FIG. 6 is a schematic representation of a hinge detail of FIG. 2

Figure 7:
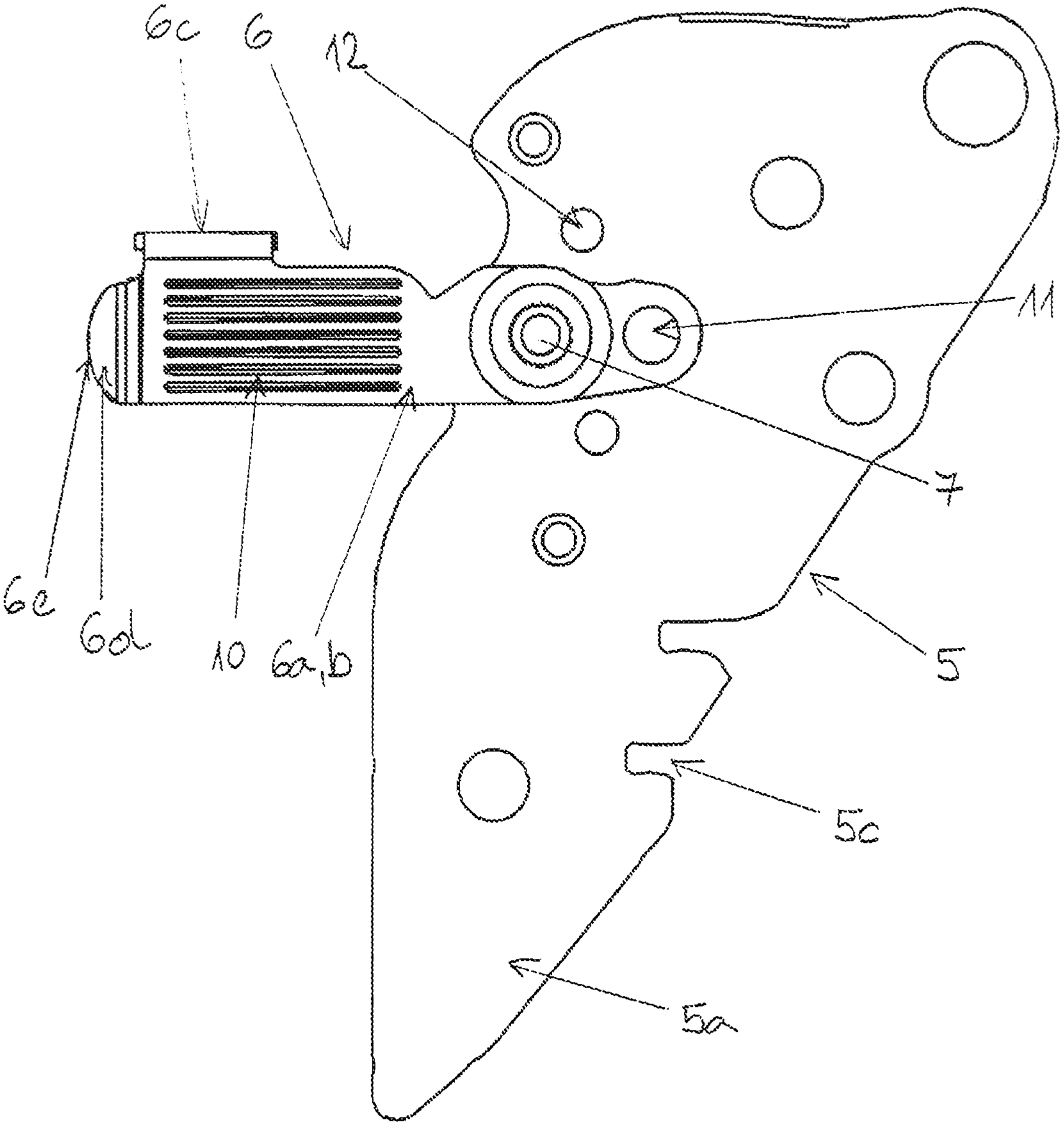

FIG. 7 is a schematic representation of a detail of the connection of the locking element to the connecting arm.

A door hinge in household appliances according to the invention consists of:

- a receiving part 1 fixed to an appliance housing (not shown in figures);
- a hinge body 3 fixed to a household appliance door (not shown in figures);
- a connecting arm 5, wherein the connecting arm 5 is provided on the side cooperating with the receiving part 1 with a connecting element 5*a* for detachably attaching the connecting arm 5 to the receiving part 1, and the connecting arm 5 is, on the side cooperating with the hinge body 3, pivotally connected to hinge body 3 via an axle 5*b*, and a locking element 6 that is pivotally attached to the connecting arm 5 via a connecting axle 7, the receiving part 1, the hinge body 3 and the locking element 6 being adapted to cooperate with each other.

The receiving part 1 is in the form of a substantially elongate box-shaped body with a cut-out 1*a* for receiving the connecting element 5*a* of the connecting arm 5 for detachably attaching the connecting arm 5 to the receiving part 1. The detachable attachment is carried out in the ways known from prior art, which, when attaching the connecting arm 5 to the receiving part 1, enable maintaining a certain clearance between the connecting arm and the receiving part 1, for example through a connecting edge formed in the lower part of the cut-out 1*a* and through a notch 5*c* formed on the lower part of the connecting element 5*a*, such that the connecting arm 5 hangs on the connecting edge over the notch 5*c*. The receiving part 1 is internally provided with an additional stopper 1*b*, on which the connecting arm 5 rests with the upper edge of the connecting element 5*a*, thus preventing the connecting arm 5 from rotating in the area of detachable attachment to the receiving part 1 due to the weight of the door when the door is normally or jerkily opened or closed, which could lead to damage in the area of the detachable attachment.

In the area intended for receiving a head 6*d* of the locking element 6, the receiving part 1 is provided with symmetrically formed matching elements 8 with first contact surfaces 8*a* of a C-shaped concave shape with a certain curvature. The matching elements 8 are positioned in the area of the cut-out 1*a*, namely on two lateral surfaces 1*c* delimiting the cut-out 1*a*. Preferably, the matching elements 8, and thus the first contact surfaces 8*a*, are in the form of a circular section with a radius R1. The concave shape of the matching element 8 can also be, for example, in the form of a section of an ellipse, a parabola, etc.

The hinge body 3 is in the form of a substantially elongate box-shaped body and has, in the part intended for receiving the locking element 6, a slot 3*a*, on which the locking element 6 is stuck with the upper edge of a cross-piece 6*c*, with which it is achieved that the locking element 6 in the unlocked position maintains a certain angle between the hinge body 3 and the connecting arm 5, which serves to more easily detach the connecting arm 5 from the receiving part 1 or the door from the housing of the appliance.

The locking element 6 is made of one metal part and has substantially the shape of a slider arranged over the connecting arm 5, i.e. astride on the connecting arm 5. It consists of two substantially straight and parallel legs 6*a*, 6*b*. Both legs 6*a*, 6*b* are pivotally attached in their lower part to the connecting arm 5 via a connecting axle 7 for rotating the locking element 6 about the axle from the unlocked position to the locked position and vice versa. The legs 6*a*, 6*b* are connected to each other in their upper part, i.e. in the part adapted to cooperate with the receiving part 1 and with the hinge body 3, by the cross-piece 6*c*. Each of the legs 6*a*, 6*b* is provided in the part distant from the connecting axle 7 with a head 6*d* with a second contact surface 6*e* of the convex C-shape with a certain curvature. Preferably, the head 6*c* and thus the first contact surface 6*e* is in the form of a circular section with a radius R2. The size of the radius R2 is between 4 to 6 mm, preferably 5 mm with a tolerance ±0.5 mm. The convex shape of the head 6*c* can also be, for example, in the form of a section of an ellipse, a parabola, etc.

In one embodiment, the radii may be different, namely the radius R1 is up to 20% larger than the radius R2, so that the curvature of the first contact surfaces 8*a* is smaller than the curvature of the second contact surfaces 6*e*.

In a second embodiment, the radii R1 and R2 can be identical, so that the curvature of the first contact surfaces 8*a* is identical to the curvature of the second contact surfaces 6*e*.

The proposed shape of the two contact surfaces 6*e*, 8*a* allows the locking element 6, and thus the door hinge, to always assume a stable position. Namely, when placing the locking element 6 in the locked position, free movement of the second contact surfaces 6*e* of the locking element 6 past the first contact surfaces 8*a* of the receiving part 1 is made possible due to the above-mentioned clearance between the connecting arm 5 and the receiving part 1 until the locking element 6 is moved to the stable position in a point 30 of stability.

The proposed shape of the two contact surfaces 6*e*, 8*a* allows the locking element 6, and thus the door hinge, to always assume a stable position even in cases when the door is suddenly and jerkily opened and closed and even when minimal forces are exerted on the hinge. Namely, when the door is slammed, the hinge mechanism may lag behind, which is especially pronounced in soft-closing versions, where the door starts to move faster than the hinge mechanism allows. In this case, the connecting arm 5 is no longer stationary in the receiving part 1, but the connecting arm 5 in the area of the connecting element 5*a* starts to tilt towards the appliance housing around a contact point 9 that represents the contact between the connecting edge and the notch 5*c* when the latter is hung on the connecting edge. When this happens, the entire centre of rotation of the door is changed, this is why the door can noticeably rise and crash into the front wall of the appliance housing. In this case, the locking element 6 moves together with the connecting arm 5, i.e. the second contact surfaces 6*e* of the locking element 6 slide along the first contact surfaces 8*a* of the receiving part 1 until the locking element 6 assumes its stable position in the point 30 of stability. The point 30 of stability represents the point of contact between the contact surfaces 6*e*, 8*a* in the stable position of the locking element 6. In the stable position, a triangle of the resulting forces is formed between the contact point 9, the point 30 of stability and the connecting axle 7, which ensures the stability of the position of the locking element 6 within the receiving element 1.

The proposed shape of the two contact surfaces 6*e*, 8*a* further ensures that even when the locking element 6 is not pushed deep enough towards the housing and is in the upper unstable position (FIG. 4) and the door slams, the relevant contact force component acts between the locking element 6 and the housing in the direction towards the point 30 of stability. When the locking element 6 is pushed too deep towards the housing and is in the lower unstable position (FIG. 5), the relevant contact force component acts in the direction towards the point 30 of stability.

A simple displacement of the locking element 6 from the locked position to the unlocked position and vice versa is further made possible in addition to the proposed shape of the two contact surfaces 6*e*, 8*a* due to the above-mentioned clearance between the connecting arm 5 and the receiving part 1. When the locking element 6 is in the locked position (in its stable position), the contact surfaces 6*e*, 8*a* are not in contact due to said clearance, but are so spaced apart that they can move freely past one another. Thus, a significantly lower force is required to move the locking element 6 from one position to another than with the existing locking elements. Moreover, in the event of a sudden door closing, the contact surfaces 6*e*, 8*a* move closer together due to said clearance and engage in a stable position thanks to their shape.

To allow a better grip of the user when moving the locking element 6 in the unlocked or locked position, the locking element 6 is provided on both outer surfaces of the legs 6*a*, 6*b* with ribs 10.

To further fix the locking element 6 in the locked/unlocked position, the locking element 6 is provided on at least one leg 6*a*, 6*b* at its end, i.e. behind the connecting axle 7, with a boss 11 which elastically deforms the locking element 6 in this part, and the connecting arm 5 is provided on the same side, in the areas defining the end position of the locking element 6 in the locked/unlocked position, with recesses 12. When moving the locking element 6 from one end position to another, the boss 11 slides on the surface of the connecting arm 5 until it engages the recess 12, whereby a "click" is heard, which further provides the user with information that the locking element 6 is located in one of its end positions. Due to the above-mentioned elastic deformation, the boss 11 retains the locking element 6 in a respective recess 12 with a certain force.

The invention claimed is:

1. A door hinge in household appliances including:

a receiving part (1) fixed to an appliance housing;

a hinge body (3) fixed to a household appliance door;

a connecting arm (5), wherein the connecting arm (5) is provided on the side cooperating with the receiving part (1) with a connecting element (5*a*) for detachably attaching the connecting arm (5) to the receiving part (1) and for ensuring clearance between the connecting arm (5) and the receiving part (1), and the connecting arm (5) is, on the side cooperating with the hinge body (3), pivotally connected to the hinge body (3) via an axle (5*b*), and a locking element (6) pivotally attached to the connecting arm (5) via a connecting axle (7) for rotating the locking element (6) about the connecting axle (7) from an unlocked position, where said connecting arm can be detached from said receiving part, to a locked position, where said connecting arm is held in a fixed position in relation to the receiving part, and vice versa, characterized in that the locking element (6) is formed of one metal part and consists of two mutually parallel legs (6*a*, 6*b*) and the legs (6*a*,6*b*) are connected to each other in their upper part by a cross-piece (6*c*) and each of the legs (6*a*, 6*b*) is provided in the part distant from the connecting axle (7) with a head (6*d*) with a second contact surface (6*e*) of a convex C-shape with a certain curvature, and in an area intended for receiving the head (6*d*) of the locking element (6), the receiving part (1) is provided with matching elements (8) with first contact surfaces (8*a*) of a C-shaped concave shape with a certain curvature, wherein, when placing the locking element (6) in the locked position, free movement of the second contact surface (6*e*) sliding along the first contact surfaces (8*a*) is made possible due to the clearance between the connecting arm (5) and the receiving part (1) until the locking element (6) is moved to the stable position in a point (30) of stability defined in said first contact surfaces (8*a*).

2. The hinge according to claim 1, characterized in that the matching elements (8) are positioned in the area of a cut-out (1*a*), namely on two lateral surfaces (1*c*) delimiting the cut-out (1*a*).

3. The hinge according to claim 1, characterized in that the matching elements (8), and thus the first contact surfaces (8*a*), are in the form of a circular section with a first radius (R1) and the heads (6*c*) and thus the second contact surfaces (6*e*) are in the form of a circular section with a second radius (R2).

4. The hinge according to claim 3, characterized in that the first radius (R1) and second radius (R2) are different, with the first radius (R1) being up to 20% larger than the second radius (R2), so that the curvature of the first contact surfaces (8*a*) is smaller than the curvature of the second contact surfaces (6*e*).

5. The hinge according to claim 3, characterized in that the first radius (R1) and second radius (R2) are identical, so that the curvature of the first contact surfaces (8*a*) is identical to the curvature of the second contact surfaces (6*e*).

6. The hinge according to claim 1, characterized in that the receiving part (1) is internally provided with an additional stopper (1*b*), on which the connecting arm (5) rests with the upper edge of the connecting element (5*a*) to prevent the connecting arm (5) from rotating in the area of detachable attachment to the receiving part (1) due to the weight of the door when the door is normally or jerkily opened or closed.

7. The hinge according to claim 1, characterized in that the hinge body (3) is provided in the part intended for receiving the locking element (6), with a slot (3*a*) for receiving the upper edge of the cross-piece (6*c*) of the locking element (6) to allow the locking element (6) in the unlocked position to maintain a certain angle between the hinge body (3) and the connecting arm (5) to detach the connecting arm (5) from the receiving part (1) or the door from the housing of the appliance.

8. The hinge according to claim 1, characterized in that the locking element (6) is provided on both outer surfaces of the legs (6*a*, 6*b*) with ribs (10).

9. The hinge according to claim 1, characterized in that the locking element (6) is provided on at least one leg (6*a*, 6*b*) at its end with a boss (11) which elastically deforms the locking element (6) in this part, and the connecting arm (5) is provided on the same side, in the areas defining the end position of the locking element (6) in the locked/unlocked position, with recesses (12), wherein, when moving the locking element (6) from one end position to another, the boss (11) slides on the surface of the connecting arm (5) until it engages the recess (12).

* * * * *